Figure 3:
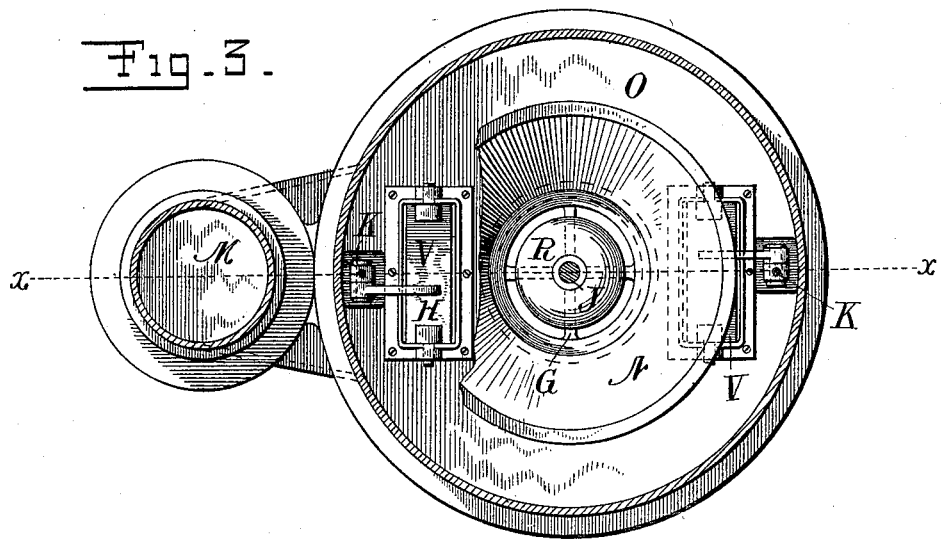

No. 635,827. Patented Oct. 31, 1899.
E. B. WESTON & W. W. JACKSON.
AUTOMATIC REGULATING WEIR.
(Application filed May 10, 1899.)
(No Model.) 3 Sheets—Sheet 1.
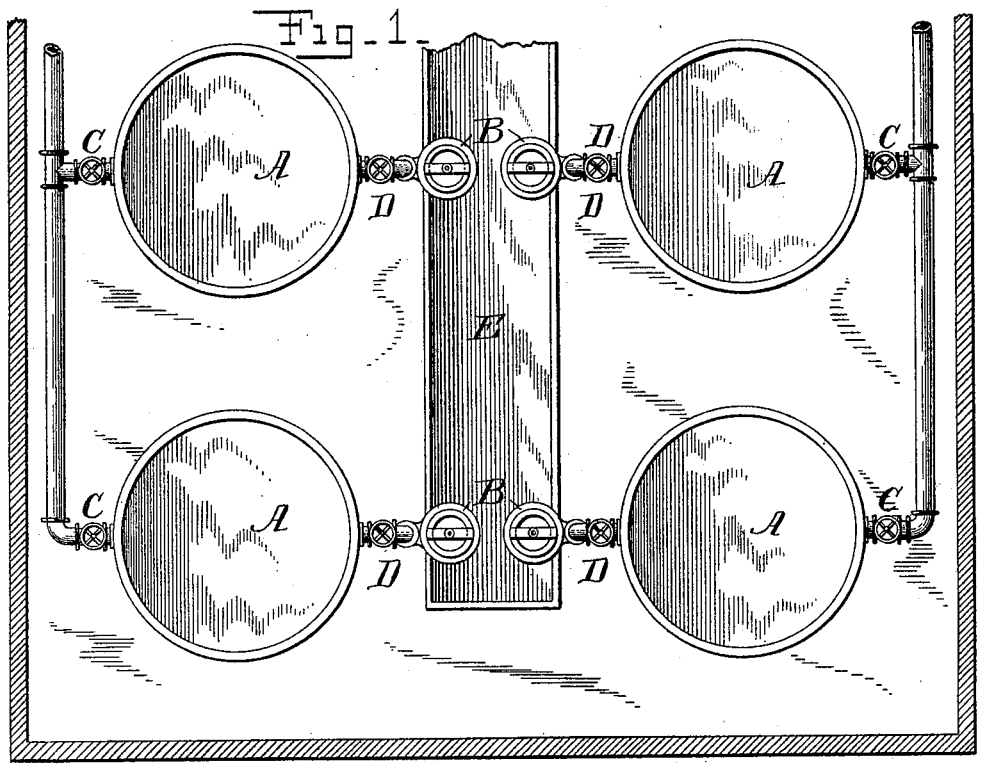
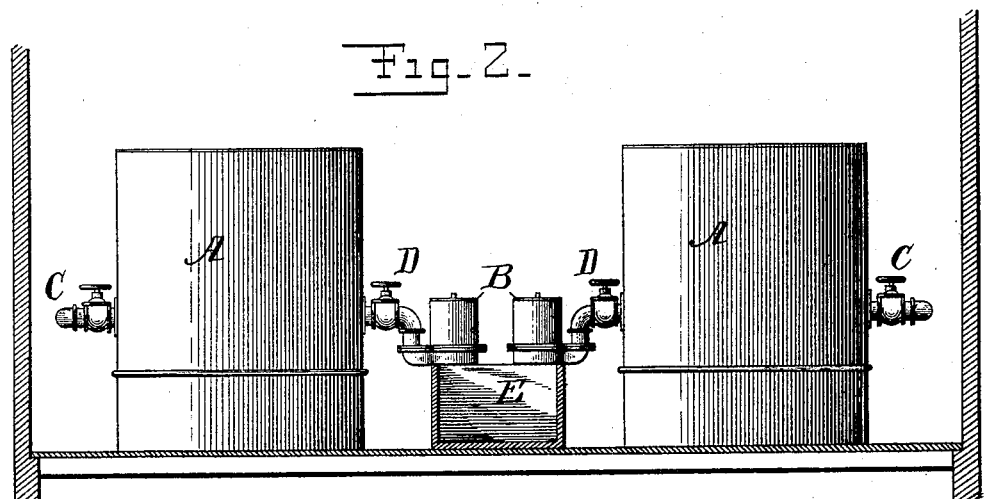

No. 635,827. Patented Oct. 31, 1899.
E. B. WESTON & W. W. JACKSON.
AUTOMATIC REGULATING WEIR.
(Application filed May 10, 1899.)
(No Model.) 3 Sheets—Sheet 2.

WITNESSES:
F. N. Roehrich
James C. Reilly

INVENTORS,
Edmund B. Weston
Walter W. Jackson
BY
J. Windon Hyde
ATTORNEY

No. 635,827. Patented Oct. 31, 1899.
E. B. WESTON & W. W. JACKSON.
AUTOMATIC REGULATING WEIR.
(Application filed May 10, 1899.)

(No Model.) 3 Sheets—Sheet 3.

UNITED STATES PATENT OFFICE.

EDMUND B. WESTON AND WALTER W. JACKSON, OF PROVIDENCE, RHODE ISLAND, ASSIGNORS TO THE NEW YORK FILTER MANUFACTURING COMPANY, OF NEW YORK, N. Y.

AUTOMATIC REGULATING-WEIR.

SPECIFICATION forming part of Letters Patent No. 635,827, dated October 31, 1899.

Application filed May 10, 1899. Serial No. 716,219. (No model.)

*To all whom it may concern:*

Be it known that we, EDMUND B. WESTON and WALTER W. JACKSON, citizens of the United States, residing in Providence, county of Providence, and State of Rhode Island, have invented an Improvement in Automatic Regulating-Weirs, of which the following is a specification.

The invention relates to an automatic regulating-weir especially designed and adapted, among other uses, to be employed in connection with mechanical filters in order to secure a constant rate of discharge of filtered water from the weir tank or chamber irrespective of the height of the water column in said weir-tank and irrespective of the condition of the filter-bed. The device may, however, be used in connection with an irrigation plant designed to supply unvarying amounts of water from the source of supply to the various consumers, or, again, to the regulation of the water-flow for power purposes, or, still again, to control the supply of solutions in chemical-manufacturing plants.

It is well known to those skilled in the art that when water first begins to flow through the filter-bed of a filter the bed is easily permeated and the rate of discharge is much greater than can be maintained after the filter-bed has become less permeable through the collection of the coagulant generally used in filter plants or the impurities removed from the water and lying on and within the filtering medium. Practice has determined a limiting velocity or rate of discharge for each unit of area of the surface of the filtering medium, and this rate must not be exceeded if the efficiency of the filter in the removal of bacteria and other impurities is to be maintained. It is not only necessary to place a maximum limit upon the rate of discharge, but it is also very desirable to preserve a constant rate of flow of the fluid, and although variations in this rate may not rise as high as the maximum limit any considerable variation is still very detrimental to the efficiency of the apparatus. Changes of rate cause changes in pressure on the filtering-bed and, however slight, will tend to cause scouring action.

Our invention is designed to obviate the disadvantages referred to and to secure a predetermined constant rate of discharge of filtered fluid from the filtering apparatus.

Our invention is illustrated in the accompanying drawings, in which similar letters of reference indicate similar parts throughout the several views.

Referring to the drawings, Figure 1 shows a plan view of a plant of four filters with the inlet-pipes for unfiltered water and the outlets for filtered water to the discharge-chamber. Fig. 2 shows in elevation and part section two filters with their controllers or regulating-weirs and the discharge-chamber. Fig. 4 shows a sectional view of one of our controllers with its inlet-pipe, and Fig. 3 exhibits a cross-sectional view of Fig. 4 on the line $x'\ x'$. Fig. 5 shows a sectional view of a modified form of controller embodying the same principle of operation. The arrows shown in the drawings indicate the flow of the filtered water.

Referring to the figures, A indicates the filter, which may be of any suitable type of gravity or pressure filter, containing the filter-bed and the stirring and other apparatus and which it is not necessary to illustrate in detail in order to explain our invention.

C C are inlet-pipes to the filter for unfiltered water, having the valves shown.

D D are the outlet-pipes for the filtered water and provided with the valves shown.

B B are the modules or controllers to regulate the flow or discharge, and E is the discharge-chamber, into which the filtered water passes for distribution.

Figure 4:
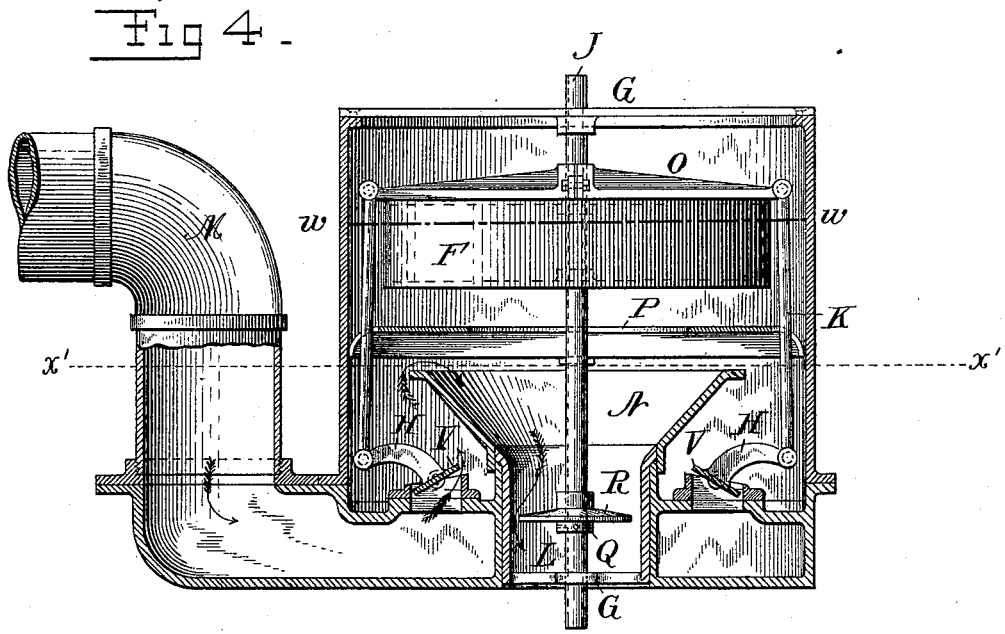
Figure 5:
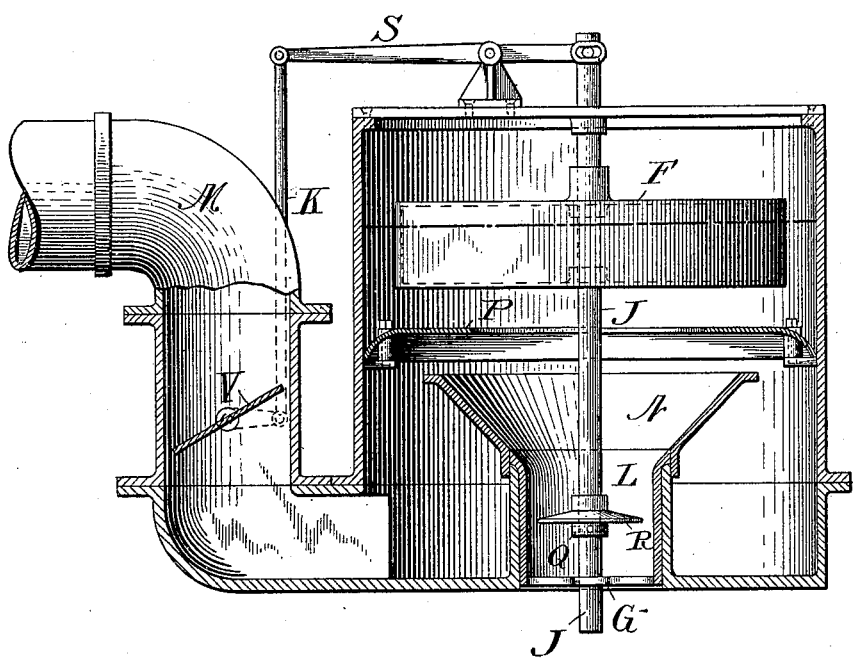

Now, referring to Figs. 3 and 4, M is the pipe through which the filtered water passes through the butterfly-valves V into the controller-chamber B. The height of water at some determined period is indicated by the dotted line $w\ w$, Fig. 4.

F is a float mounted upon the float-stem J, operating in the guides G G, and P is a deflecting or baffling plate designed to quiet the water and reduce any currents, thereby giving a smooth entrance to the discharge-tube, being aided in this respect by the cone N.

N is a cone-shaped funnel leading to the discharge-tube L, having the purpose just stated, and O is the float-chamber.

Q indicates air-vents.

Mounted also upon the float-stem J at a fixed distance below it, so as to be maintained at a constant depth, there is the disk R, which is preferably turned with a thin edge and sharp corners and of such a diameter as will give the annular orifice between the disk and walls of the discharge-tube L a predetermined area proportionate to the rate of discharge of the filtered fluid desired. It is obvious that this rate of discharge can be increased or decreased by decreasing or increasing, respectively, the diameter of the disk R.

The object of having the float F and the disk R mounted at a fixed distance from each other is to maintain a constant head of water above the disk R, irrespective of the height of the water-level in the chamber and the consequent position of the float F.

The butterfly-valves V, of which there may be one or more, are operated by the valve-levers H H, connected to the valve-links K K and thus to the float, so that the rise and fall of the float F operates to close and open the valves V V.

The operation of our device is as follows: The filtered water enters the instrument through the inlet-pipe M and reaches the float-chamber through the valves V V. It is discharged from the instrument through the annular orifice between the regulating-disk R and the discharge-tube L, so that whatever the level of the water in the float-chamber may be the discharge through the annular orifice is constant, as the depth of the orifice below the free level of the water and its area remain the same.

The function of the butterfly-valves is to regulate the inflow of water through the pipe M, and they act in the following manner: With a given head or pressure on the surface of the filtering medium and free discharge from the filter the rate of discharge will vary with the condition of the filtering medium. For a given head or pressure on the surface, the rate of discharge being controlled by the module, the condition of the filtering medium will affect the pressure in the pipe M, the pressure being greater with a clean filter-bed than with a filter-bed clogged with coagulant and impurities. If for a given level w w of the water in the float-chamber the pressure in the pipe M be such that more water will pass through the valves V V than can be discharged through the annular orifice, the level of the water in the float-chamber will rise and with it the float to such a point that the flow through the valves V V is so throttled that the equilibrium is once more established between the supply to and the discharge from the float-chamber. If, on the other hand, the pressure in the pipe M be reduced, and consequently the flow through the valves V V, the water-level falls and the valves V V are opened wider by the float, so as to preserve the equilibrium. Should the head in the inlet-pipe M be reduced below that determined as the minimum limit, the float will be submerged less, and consequently the head on the annular orifice and the discharge-tube will be diminished below the minimum desired. This will indicate a needed washing of the filter-bed, and its indication can be manifested to the operator by an electric alarm (not shown in the drawings) which can be connected to the float-stem of the controller, so as to ring a bell, or a small pipe can be run from the lower part of the pipe M, leading to the controller, in which a ball-float and graduated rod can be placed, so as to be watched by the attendant. We have not thought it necessary to illustrate this device in the drawings. The rated capacity of discharge may be adjusted by altering the degree of submergence of the disk R or by changing the area of the annular orifice by substituting a larger or a smaller disk, as above described.

If there be a free discharge from the pipe L into the atmosphere, it is necessary that air be freely admitted below the disk R, and this may be effected either wholly or in part from below, or the float-stem may be made hollow, with vents Q below the disk, as illustrated, Figs. 4 and 5.

In Fig. 5 we have shown a modification of our device which while it is otherwise like the form of apparatus shown in Fig. 4 differs therefrom in the fact that the butterfly-valve V is placed in the inlet-pipe M, this valve being operated to open or shut by means of the jointed lever K S, connected to the float-stem J, so that the rise and fall of the float-stem J operates to close and open the valve V, respectively, and thereby regulate the flow of water into the controller-chamber.

It may be added that instead of a single disk R, having a single sharp edge, we may use a disk which is made up of several disks, or it may have rounded edges; but in this latter case the discharge-orifice should be made smaller for the same rate of discharge by increasing the diameter of the disk. Further, the disk may be of any suitable form, square, oblong, or irregular, and the discharge-tube may of course be of any desired shape in cross-section, the fundamental idea being that the disk, and thereby the orifice, may traverse the discharge-tube without friction or retardation of any kind and may keep the area between the disk and tube constant. So, again, any suitably-balanced valve may be used in place of the butterfly-valves.

Having thus described our invention, what we desire to secure by Letters Patent is—

1. In a module, a constant-discharge opening, consisting of an orifice traversing a tube of unvarying diameter through the movement of a disk situated in said tube, and operated by a float, substantially as and for the purpose set forth.

2. In a module, the combination of a float and disk, a discharge-tube, and inlet-valves, said valves being operated by the float, substantially as described.

3. In a module, the combination of an orifice traversing a tube through the movement of a disk operated by a float, and one or more balanced inlet-valves operated by said float, substantially as described.

4. In a module, the combination of an orifice traversing a tube through the movement of a disk operated by a float, and one or more balanced inlet-valves situated in a false bottom in the filter-chamber and operated by said float, substantially as described.

5. In a module, the combination of an orifice traversing a tube through the movement of a disk operated by a float, one or more balanced inlet-valves situated in a false bottom in the float-chamber and operated by said float, and a baffling-plate in said float-chamber, substantially as described.

6. In a module, the combination of an orifice traversing a tube through the movement of a disk operated by a float, one or more balanced inlet-valves situated in a false bottom in the float-chamber and operated by said float, a baffling-plate in said float-chamber and a funnel-shaped discharge-outlet, substantially as described.

7. In a module, the combination of an orifice traversing a tube through the movement of a disk operated by a float, and a balanced valve situated in the inlet-pipe to the float-chamber and operated by said float, substantially as described.

8. In a module, the combination of an orifice traversing a tube through the movement of a disk operated by a float, a balanced valve situated in the inlet-pipe to the float-chamber and operated by said float, and a baffling-plate in said float-chamber, substantially as described.

9. In a module, the combination of an orifice traversing a tube through the movement of a disk operated by a float, a balanced valve situated in the inlet-pipe to the float-chamber and operated by said float, a baffling-plate in said float-chamber, and a funnel-shaped outlet, substantially as described.

EDMUND B. WESTON.
WALTER W. JACKSON.

Witnesses:
THOS. R. FARRELL,
GILMAN E. JOPP.